April 19, 1966  A. PINEAU  3,246,843
ELECTRICALLY INSULATED RAIL FASTENER
Filed Nov. 30, 1961
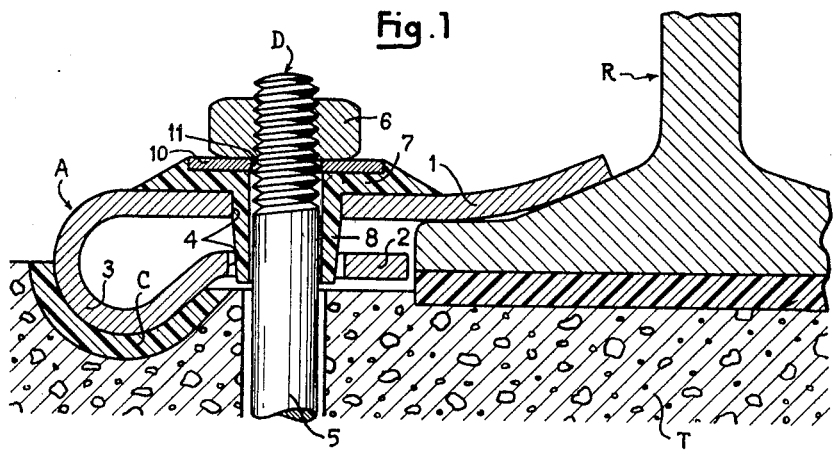
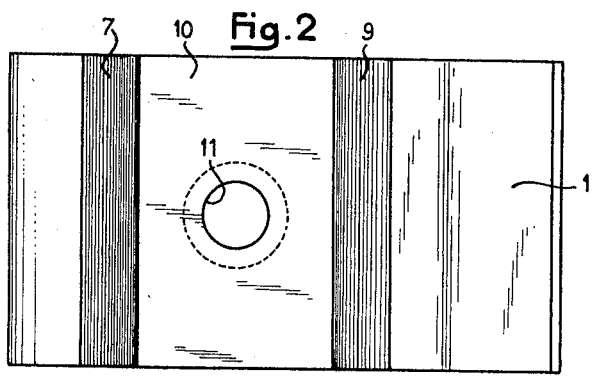
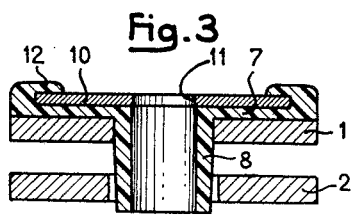

United States Patent Office 3,246,843
Patented Apr. 19, 1966

3,246,843
ELECTRICALLY INSULATED RAIL FASTENER
André Pineau, Saint-Cloud, France, assignor to P.C.C.,
Paris, France, a French body corporate
Filed Nov. 30, 1961, Ser. No. 156,020
Claims priority, application France, Dec. 3, 1960,
845,886
3 Claims. (Cl. 238—349)

The present invention relates to fasteners for securing rails to sleepers or ties, and in particular to fasteners comprising a steel strip which bears at one end against the flange of the rail and at the other end against the sleeper or tie and which is held down by a clamping device such as a screw or bolt extending through an aperture formed in the middle part of the strip and provided with a nut which bears against said middle part.

With the development of electrification and signalization, it is often necessary to insulate the rail from the sleepers or ties. To this end, there is provided under the flange of the rail a sole or pad of rubber or other insulating material, and under the end of the strip which bears against the tie a pad or block of the same material.

It is moreover necessary to electrically insulate from the strip the clamping device driven into the tie so as to complete the insulation.

The insulation of the clamping device, however, gives rise to difficulties which are imperfectly solved by presently-known solutions. These solutions generally consist in mounting on the shank of the clamping device a spigoted washer of insulating material which bears against the middle part of the strip.

These washers, which are movable relative to the strip, undergo high shear stresses owing to a wedging between the shank of the clamping device and the periphery of the aperture in the strip. Thus, in the region in which the washer is connected to the spigot the washer is liable to break and destroy the insulation. It is of course possible to reinforce the washer but this gives rise to further difficulties. Indeed, taking the case of a washer constituted by an insulating material interposed between two steel washers, the contact between the lower steel washer and the strip of the fastener would have a tendency (confirmed by experience) to occur almost exclusively in the vicinity of the general plane of symmetry of the device and the resulting increased local stress undergone by the strip could affect in a non-negligible manner its behaviour on the track. Further, very small sliding movements in the contact between the metal washer and the strip of the fastener occur under the effect of the bending movements of the strip brought about by the deformations in the track due to the rolling loads. These small sliding movements are liable to produce in the long run a deterioration in the contacting metal surfaces in accordance with a known mechanism known as rubbing corrosion.

The object of the invention is to remedy these drawbacks and provide an improved fastener of the aforementioned type which is electrically insulated from its clamping device. Said fastener is so arranged that a spigoted-washer having a flange or washer portion of insulating material, such as rubber or plastic material, is permanently secured, by sticking, or by any of the known elastomer-to-metal adhesion or bond methods, to an upper arm of a double-leaf clip fastener around the aperture provided for the passage of the clamping device and extends into said aperture by a spigot adapted to surround the shank of the clamping device.

The insulating spigoted-washer is thus integral with the double-leaf clip washer portion thereof conforming to the deformations of the strip and insuring at each instant a large bearing surface for the clamping device.

Further, the washer portion is not liable to be sheared by the wall of the clamping aperture with respect to which it remains stationary. Advantageously, in order to protect the sheet from the harmful effects which could result from a direct clamping action of the clamping device on the upper face of the sheet, a metal plate, for example of steel, is secured or better still, bonded to said upper face by any of the known elastomer-to-metal adhesion methods.

Further features and advantages of the invention will be apparent from the ensuing description, with reference to the accompanying drawing to which the invention is in no way limited.

In the drawing:
FIG. 1 is a longitudinal sectional view of the embodiment of a fastener according to the invention shown mounted on the track;
FIG. 2 is a plan view of the underside of the fastener; and
FIG. 3 is a cross-sectional view, through the aperture provided for the passage of the clamping device, of a modification of the fastener according to the invention.

As shown in FIG. 1, the fastener A according to the invention is a double-leaf clip adapted to maintain a rail R on a sleeper or tie T, a rubber sole or pad S being interposed between the flange of the rail R and the tie T.

The fastener A comprises a strip of spring steel bent in such manner as to have two superposed, parallel arms 1 and 2 interconnected by a loop portion 3. The loop portion 3 is accommodated in an insulated recess in the tie T, a rubber pad C is provided to electrically insulate the fastener from the tie in this region. The arms 1 and 2 are provided with aligned apertures 4 to allow passage of a clamping device D consisting, in the presently-described embodiment, of a bolt 5 and a nut 6. The device D elastically applies the inner end of the longer arm 1 against the flange of the rail R. The shorter arm 2 has an end face for limiting lateral movement of the rail. It is clear that in order to complete the electrical insulation of the rail R from the tie T, the fastener A must be insulated from the device D.

This is the delicate problem that the invention solves in an improved manner.

According to the invention, the upper face surface of the arm 1 carries an insulating element having a flange portion or washer portion 7 of insulating material such as rubber or other plastic material which surrounds the aperture 4 circumferentially and is permanently secured to said upper face in that it is stuck or bonded thereto. This flange portion is downwardly extended by a spigot extending into and through the apertures 4 of the arms 1 and 2. The spigot has an axial bore coaxial with the apertures on the arms and extending through said washer portion.

The flange portion or washer portion 7 is, in the presently-described embodiment, rectangular and extends over the entire width of the strip 1. On its edges perpendicular to the longitudinal axis of the arm 1, the flange portion 7 has chamfered portions 9 which provide a large overlapping area and therefore a better insulation.

The flange portion 7 carries a metal bearing plate 10 which is fixed to the insulating member in the same manner as the latter is secured to the arm 1. It will be observed that this plate leaves the chamfers 9 free.

The plate 10 and the flange portion 7 are each provided with an aperture in alignment with the apertures 4 of the fastener 10. The diameter of the aperture 11 of the plate 10 is advantageously chosen to be as small as possible, taking into account the manufacturing tolerances for the bolt or screw 5 extending therethrough, so that the guiding of this screw is obtained through the medium of the bearing plate and not through the medium of the insulating material of the sheet 7. In this way, the wedging forces which would otherwise tend to be applied to the spigot 8 are avoided and the function of the spigot is restricted to that of a simple insulating screen without any mechanical action. Such an arrangement is particularly advisable when the insulating material is an elastomer, such as rubber, secured by adhesion to the face of the strip and the upper bearing plate. The guiding forces between these two elements are therefore transmitted elastically by a shear stress parallel with their respective faces within the layer of the interposed elastomer whose characteristics are determined (mechanical properties of the elastomer, thickness of the layer, and the effective area of the latter) in such manner as to withstand such a guiding stress without abnormal strain or fatigue.

When the arm 1 bends under the effect of the clamping down forces such an arrangement affords, with respect to those previously known, marked advantages as concerns limitation of the fatigue undergone by the elastically yieldable strip. Thus, for a sufficient thickness of the bearing plate 10 the layer of elastomer interposed between the bearing plate and the arm 1 insures a practically homogeneous distribution of the bearing stresses over a large area; in this way, not only is the localization of the stresses in the vicinity of the aperture 4 (whose periphery constitutes, as is known, a region which is particularly liable to split due to fatigue under the effect of the alternating bending stresses) avoided but it is possible to distribute the bearing forces in the best manner over substantially the whole of the width of the strip. In this way, the working conditions under bending stress of the strip are very greatly improved.

In order to improve the insulation, there is provided in the embodiment shown in FIGS. 1 and 2, a large extension 9 in the direction of the axis of the strip of the sheet 7 with respect to the bearing plate 10 and this permits extending the leakage paths and thereby preclude short-circuiting due to a progressive deposit of electrically conductive dirt. The danger of short-circuiting exists to a lesser degree on the sides of the arm 1 owing to the fact that these sides are vertical. Therefore, it should be sufficient to restrict the length of the leakage paths to a single thickness of the sheet 7 as shown. However, if it is desired to provide a fuller protection against electric leakage on the sides of the flange portion 7 an arrangement such as that shown in FIG. 3 by way of example could be adopted.

In this arrangement the extension of the leakage paths on the sides of the arm 1 is obtained by a partial overlapping of the bearing plate 10 by the flange portion 7 by means of a bead or flange 12. These flanges could be provided not only along the edges of the plate 10 which are parallel with the axis of the branch 1 but also along the other two edges of the plate 10. As an alternative arrangement, the sheet 7 could have on its four edges extension portions 9 of the type described in the first embodiment.

Although specific embodiments of the invention have been described, many modifications and changes may be made therein without departing from the scope of the invention as defined in the appended claims.

Thus the insulating element flange portion and the bearing plate could have shapes other than the rectangular shape described and these two elements could have a width less than that of the strip.

Having now described my invention what I claim as new and desire to secure by Letters Patent is:

1. A fastener for use in anchoring a railway rail to a tie, said rail having a flange for anchoring on said tie, said fastener comprising a double-leaf clip comprising a bent, resilient, metal strip having two substantially parallel arms of unequal length in superposed relationship and an end loop joining said two arms, said two arms comprising a lower arm anchorable on said tie for limiting lateral movement of said flange relative to said tie and a longer upper arm for overlying said lower arm, and said flange and bearing thereon, said arms each having an aperture, the apertures being disposed coaxial, a resilient, electrically insulating element comprising a flange portion permanently bonded directly on said longer upper arm circumferentially of said aperture on said longer upper arm, a spigot on said insulating element integral with said flange and extending in a direction away from said flange and axally through said apertures, said spigot having an outer surface the full axial length thereof disposed in position ineffective to hold said spigot from axial movement relative to said clip, whereby in use relative movement of said flange portion on said insulating element and said clip is precluded and said spigot is kept free of excessive shear stresses and said spigot having a through axial bore extending through said flange portion and coaxial with said apertures for receiving a bolt extending therethrough for anchoring and tightening said clip arms relative to said tie, and said spigot having an axial length for completely insulating said bolt from said arms.

2. For use in an electrically insulated rail fastening arrangement, said arrangement comprising, in combination, a railway tie, a railway rail having a flange for anchoring on said tie, an insulating member between said flange and said tie for electrically insulating said rail from said tie, said tie having an insulated recess spaced from said flange, and fastener means comprising an elongated fastener spaced from said recess and said flange and anchored to said tie, an improved rail fastening clip comprising a double-leaf clip comprising a bent, resilient, metal strip having two substantially parallel arms of unequal length in superposed relationship and an end loop accommodated in operation in said recess on said tie and integrally joining said two arms, said two arms comprising a lower arm disposed in operation on said tie for limiting lateral movement of said flange relative to said tie and a longer upper arm overlying said lower arm and said flange and bearing thereon, said arms each having an aperture, the apertures being disposed coaxial, a resilient, electrically insulating element comprising a spigoted-washer having a washer portion permanently bonded directly on an upper surface on said longer upper arm circumferentially of said aperture thereon, a spigot on said insulating element integral with said washer portion and extending away from said washer portion and axially through said apertures, said spigot having an outer surface the full axial length thereof disposed in position ineffective to hold said spigot from axial movement relative to said clip, whereby in use relative movement of said flange portion on said insulating element and said clip is precluded and said spigot is kept free of excessive shear stresses, and said spigot having a through axial bore extending through said washer portion and said apertures for accommodating said elongated threaded fastener extending therethrough coaxial with said apertures, said spigot having an axial length sufficent to insulate electrically said elongated fastener from said clip, and said fastener means in said combination comprising a fastening element cooperative with elongated fastener and movable axially on said elongated fastener to variable fixed axial positions on said elongated fastener for bearing on said washer portion for anchoring and tightening said clip arms relative to said tie.

3. In a combination according to claim 2, said elongated fastener comprising a threaded bolt and said fastening element comprising a threaded nut on said bolt, and said clip comprising a metal plate secured on an upper surface of said washer portion of said insulating element for providing a bearing surface circumferentially of said bolt for said nut to bear thereon.

References Cited by the Examiner

UNITED STATES PATENTS

| | | | |
|---|---|---|---|
| 1,320,712 | 11/1919 | Shermerhorn | 238—155 |
| 2,761,347 | 9/1956 | McKee | 85—50 |
| 3,013,643 | 12/1961 | Perry | 85—2 |

FOREIGN PATENTS

| | | |
|---|---|---|
| 836,882 | 6/1960 | Great Britain. |
| 848,143 | 9/1960 | Great Britain. |
| 858,108 | 1/1961 | Great Brtain. |
| 221,964 | 6/1959 | Australia. |
| 1,244,383 | 9/1960 | France. |
| 1,227,308 | 3/1960 | France. |
| 1,255,512 | 1/1961 | France. |

ARTHUR L. LA POINT, *Primary Examiner.*

LEO QUACKENBUSH, *Examiner.*